Feb. 21, 1967　　　　　W. T. FURGERSON　　　　3,305,449
NUCLEAR REACTOR CORE ASSEMBLY
Filed Sept. 14, 1965　　　　　　　　　　　　　2 Sheets-Sheet 1
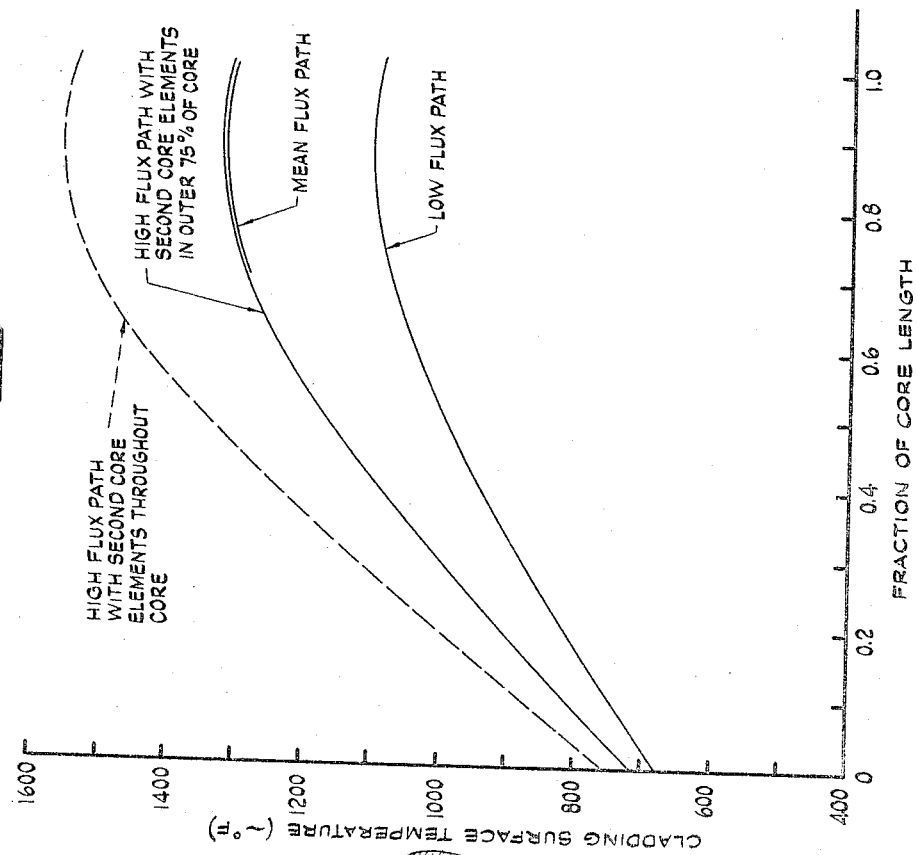
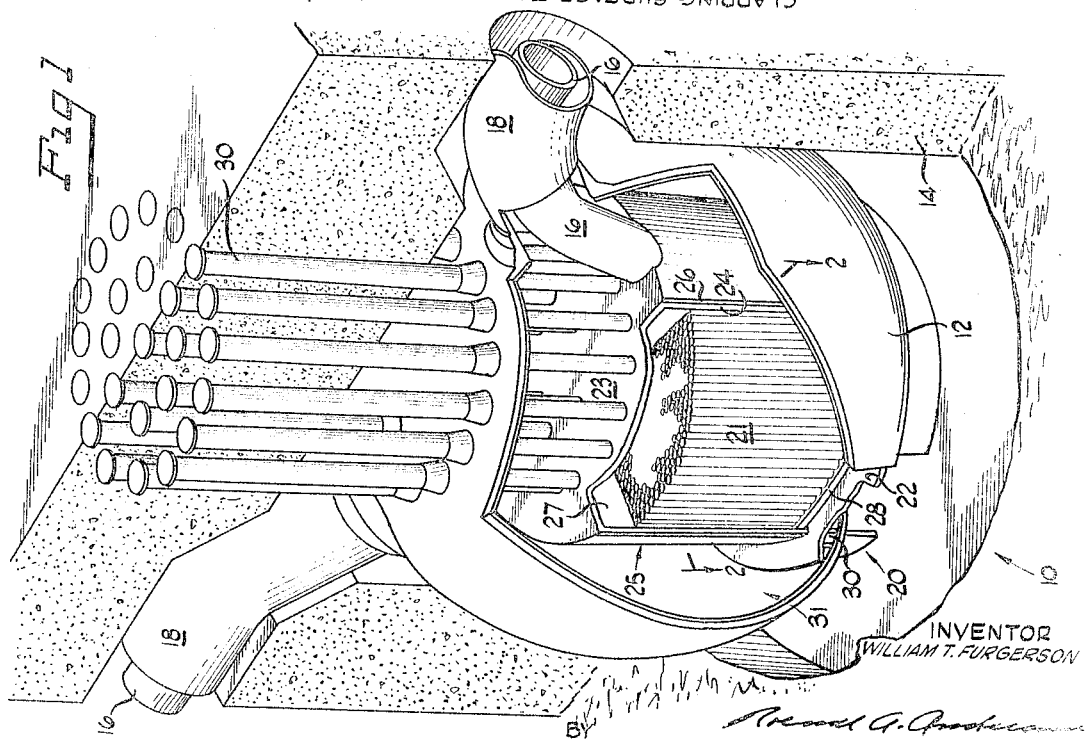
INVENTOR
WILLIAM T. FURGERSON
ATTORNEYS Feb. 21, 1967  W. T. FURGERSON  3,305,449
NUCLEAR REACTOR CORE ASSEMBLY
Filed Sept. 14, 1965  2 Sheets-Sheet 2
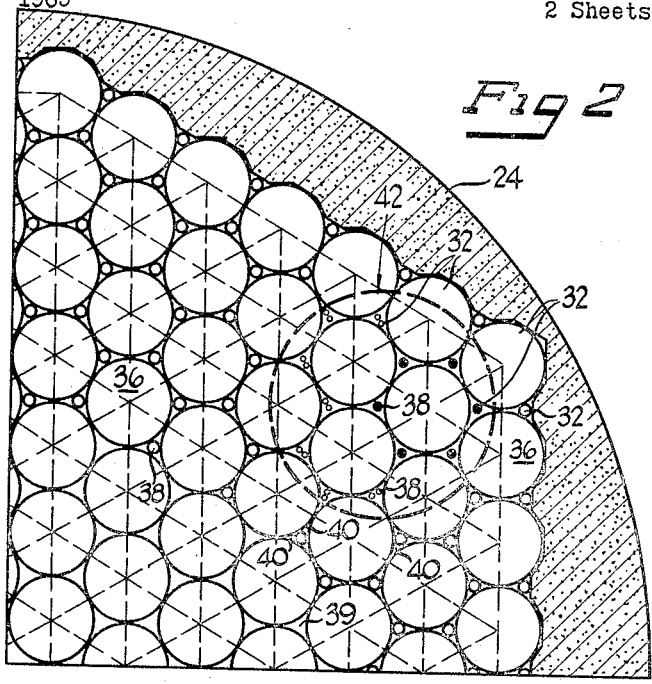
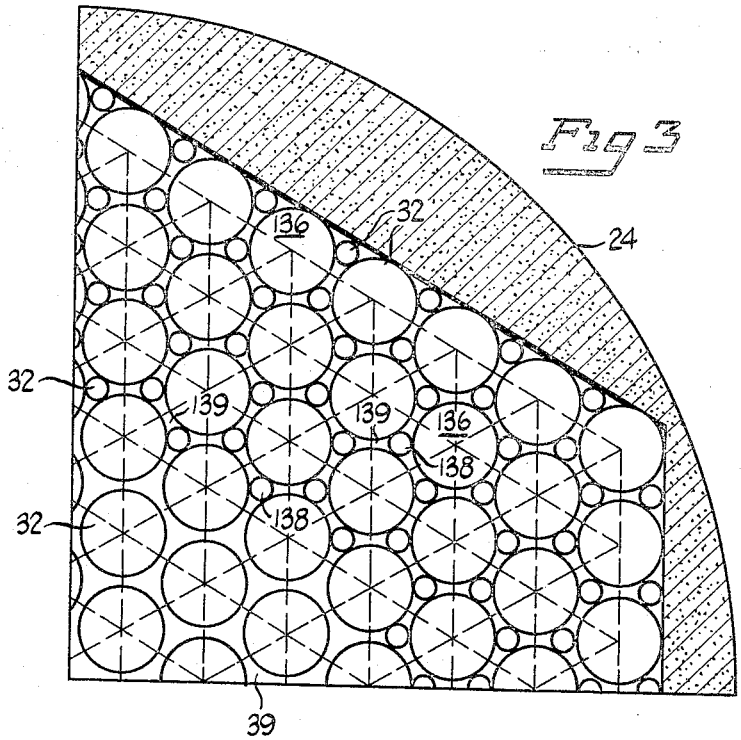
INVENTOR
WILLIAM T. FURGERSON
BY *Roland A. Anderson*
ATTORNEYS 3,305,449
NUCLEAR REACTOR CORE ASSEMBLY
William T. Furgerson, Del Mar, Calif., assignor, by mesne assignments, to the United States of America as represented by the United States Atomic Energy Commission
Filed Sept. 14, 1965, Ser. No. 487,340
9 Claims. (Cl. 176—50)

The invention described herein was made in the course of, or under, a contract with the U.S. Atomic Energy Commission.

This invention relates generally to nuclear reactors and, more specifically to an improved nuclear reactor core.

Nuclear reactors of the heterogeneous type have been developed in which the fuel and other elements are distributed in a fairly definite geometrical pattern or lattice. Such reactors may employ cores comprising fuel elements in the form of rods or plates supported by a grid-type structure inside a pressure vessel or tank. In addition to the fuel elements, other core elements are usually employed which may contain neutron poison material, neutron moderating material or fertile material and which also may be in the form of rods or plates. A cooling liquid or gas may be circulated through the spaces not occupied by the core elements so as to remove heat produced in the core by nuclear fission in the operation of the reactor.

The design of such reactor cores necessitates solving the problem of concomitantly adjusting both the temperatures and neutron flux in the core to the optimum conditions in view of the use to be made of the reactor. In a power reactor for example, the same problem may be stated in terms of maximizing the overall temperature of the coolant stream as it leaves the reactor core, thus maximizing the heat removed by the coolant from the reactor and hence the power produced therefrom.

The problem of achieving optimum reactor or coolant temperatures for a particular purpose is especially difficult because heat is not generated uniformly in such a reactor. Generally, heat flux in a reactor core decreases both axially and radially from a peak near or at the center of the core. In addition, local perturbations in heat generation may occur due to inhomogeneities in the reactor structure. Similarly, neutron flux is not generally uniform throughout a reactor core. The two problems are interrelated since neutron flux affects heat generation and temperature changes can affect spatial relationships of the core elements and thereby affect neutron flux. Due to these variations, the temperatures in different regions of the core may vary considerably and portions of the coolant stream circulating through different regions of the core may emerge at different outlet temperatures, causing the overall outlet temperature of the total coolant stream to be much below the maximum, an undesirable result in a power reactor.

In a known form of heterogeneous reactor core design, the core is composed of an array of circular cylinders of equal radii and arranged with their axes parallel in a regular lattice or pattern. Use of core elements having such identical forms is advantageous because the elements may be more easily fabricated in large numbers and may be interchanged with each other in the reactor. A circular cross section is advantageous because the element is thereby made more compact, contributing to its strength and minimizing the amount of cladding required to cover the element. As previously indicated, some of the cylinders may include neutron moderating material, neutron poison material, or fertile material. The spaces between the cylinders define coolant passages in which circulates coolant fluid in a generally longitudinal direction in the core, which coolant serves to remove heat from the core.

If the cylinders are loosely packed, the longitudinal passages between them are interconnected in the directions transverse to the direction of fluid flow. If, on the other hand, the cylinders are closely packed, a plurality of coolant passages are provided which are essentially separate from each other, although there may be some coolant leakage between adjacent passages unless suitable sealing means are provided. With such a core arrangement, the amount of heat removed depends on the volume of the coolant passages, the rate of coolant flow, the heat capacity of the coolant, and the increase in coolant temperature during its passage through the core.

The rate of coolant flow through the various coolant passages and the rise in coolant temperature resulting therefrom has been regulated, in some applications, by providing the various coolant passages with entry orifices of different sizes. The passages through regions of the core in which there is low heat flux may be provided with small entry orifices while larger orifices may be provided for passages through regions of higher heat flux. The rate of flow of the coolant stream may thereby be suitably adjusted in different regions of the core so that more coolant circulates through and more heat is removed from high temperature regions in a given time than is the case with respect to low temperature regions. The exit temperature of the various portions of the coolant stream will thus tend to be equalized. This means of regulating temperature and heat removal, which is commonly referred to as "orificing" the fluid coolant, does not, however, operate to control the volume of the coolant passages but only the amount of coolant allowed to enter the passages; and both of these factors influence the amount of heat removed. Furthermore, it is less effective where the longitudinal passages are extensively interconnected so that appreciable transverse distribution of the coolant can occur.

A major problem in a nuclear reactor core of the above-described design is that when one has determined the core volume, fuel material, moderating material, dimensions of the core element cylinders, and the form and dimensions of the lattice or pattern in which the elements are arranged, the resulting volume of the coolant passages will also be determined. The amount of heat removed as a result, even utilizing the technique of orificing the coolant, may not correspond to that which is desired from the standpoint of optimum core temperature distribution or heat removal.

Accordingly, an improved nuclear reactor core design in which core temperature, heat removal, and neutron flux may be optimized for a variety of applications is desired.

It is, therefore, an important object of the present invention to provide a nuclear reactor core adapted to optimize heat removal, neutron flux, and temperature distribution.

Another object of the invention is to provide a reactor core in which the relationship of coolant passage volume to core volume is such as to optimize heat removal from the core.

Still another object of the invention is to provide an improved nuclear reactor core in which the rate of coolant flow and heat removal may be effectively adjusted throughout the core.

Yet another object of the invention is to provide a simple means of adjusting neutron flux in a reactor core which contributes to optimum temperature distribution and heat removal.

A further object of the invention is to provide a nuclear reactor core arrangement having improved heat transfer efficiency.

Other objects and advantages of the invention will become apparent from the following description when considered in conjunction with the accompanying drawings, in which:

FIGURE 1 is a diagrammatic partially broken away perspective view of a reactor embodying various features of the invention:

FIGURE 2 is a fragmentary diagrammatic horizontal sectional view through the reactor core taken generally along line 2—2 of FIGURE 1 showing one quadrant of the core;

FIGURE 3 is a view similar to FIGURE 2 of an alternate embodiment of a reactor core having various features of the invention; and FIGURE 4 is a graph illustrating temperature distribution in the improved reactor core illustrated in FIGURE 1.

As shown in the accompanying drawings, the present invention generally comprises a reactor core including a group of first cylindrical core elements containing fuel, arranged in a regular pattern and defining generally longitudinal coolant passages and a group of smaller cylindrical core elements so positioned in the coolant passages among the first core elements that the volume of the coolant passages relative to the core volume is such as to optimize heat removal.

More specifically, in FIGURE 1 a reactor 10 is illustrated which generally comprises a spherical pressure vessel 12 disposed within a suitable confining structure 14 of concrete or the like and having fluid coolant inlets and outlets in the form of two pairs of concentric ducts 16 and 18 disposed adjacent the top of the pressure vessel 12 and on opposite sides thereof. The inner ducts 16 are employed as the inlets and the outer ducts 18 as the coolant outlets. The fluid coolant may be any of a variety of conventional liquids, such as water or a suitable organic substance. A gas such as helium or carbon dioxide, may also be used as the coolant. Of course, the reactor parameters depend in part upon the particular coolant used. For convenience, the invention is hereinafter described primarily as a system utilizing a gaseous coolant, but no unnecessary limitation is to be implied therefrom.

The illustrated reactor vessel includes a supporting base structure 20 of steel, or the like, upon which rests the entire core assembly 21, a bottom reflector 22, a top reflector 23 and an annular side wall reflector 24 of a suitable material such as, for example, graphite which together comprise an inner core container 25. A thermal shield 26 is disposed between the wall of the pressure vessel and the side wall reflector 24. At the upper and lower ends of the core assembly 21 are top and bottom grid plates 27 and 28 which provide support for the core elements and, in part, serve as shields or reflectors for the ends of the core 21. Nozzles or tubes 30 extend upwardly from the core assembly 21 through the top reflector 23, the wall of the pressure vessel 12 and the confining structure 14, thereby providing means for inserting and removing various elements of the core assembly as desired.

The inner coolant ducts 16 extend through the walls of the pressure vessel to the top reflector 23 and communicate with the inner core container 25 in which is disposed the core assembly 21. As the coolant reaches the container 25, it is directed inwardly and downwardly through the core 21 where it absorbs heat produced by the nuclear reaction which takes place within the core. The base 20 is provided with passageways for the coolant which communicate with the core assembly 21 and the space 31 between the inner core container 25 and the wall of the pressure vessel 12. As the coolant reaches the lower end of the core, it passes out of the core and into the passageways 30 in the base 20 and, thence, into the space 31. The outer ducts 18 communicate with the space 31 and coolant flows from the space 31 outwardly of the pressure vessel 12 through the outer ducts.

More specifically, structural arrangements of the core 21 showing various of the features of the invention are illustrated in FIGURES 2 and 3 which are horizontal sections of quadrants of two alternate reactor cores. FIGURE 2 illustrates a reactor core comprising a plurality of core elements 32 in the form of circular cylinders mounted with their axes parallel to one another and, as shown, with their axes vertical. The elements 32 comprise two distinct groups: a group of first core elements 36 which include nuclear fuel and have equal radii and a group of second core elements 38 which have smaller radii than the first core elements. The composition of the second core elements may include fuel, moderating material, fertile material or neutron poison material, as will be described more fully below.

The first core elements or fuel elements 36 are arranged in a regular lattice or pattern. As illustrated, the first core elements are placed in an equilateral triangular array or pattern, i.e. with the axes of the first core elements positioned on the corners of a plurality of equilateral triangles which are interconnected by having common sides and corners. In the embodiment of FIGURE 2 the triangles have sides equal to the diameters of the first core elements. Hence the first core elements are tangent to one another along longitudinally extending lines and define longitudinal passages for coolant flow having cross sections of a distinct shape which will be referred to herein as a "tricusp." This, of course, is the most compact arrangement of such identical elements but it would be possible for the elements 36 to be disposed on the corners of other figures such as squares. In any event, the sides of the elements 36 generally define a plurality of generally parallel longitudinally extending passages or channels 39 for the fluid coolant which passages as shown are generally vertical. These passages will be essentially separate and distinct from one another although some leakage may take place between adjacent channels unless suitable sealing means are provided along the lines of tangency of the cylinders.

As previously noted, it is desirable that the core elements be in the form of right circular cylinders because this compact form contributes to strength and minimizes the amount of protective cladding required to cover the elements. Furthermore, identical elements may be more easily fabricated in large numbers and interchanged with one another. It may be seen, however, that if only the first core elements 36 having identical radii were present in the core, the relative volume of the core elements 32 and the coolant passages 39 would be invariable for any particular lattice arrangement, such as the illustrated equilateral triangular array, thus making it more difficult to optimize heat removal. Furthermore, since the coolant passages would be uniformly distributed across the core, it would be difficult to remove heat from the hotter axial regions of the core even if the above described technique of orificing coolant flow were utilized, since orificing affects only the rate of coolant flow in certain passages and not the volume of the passages.

In order to solve this problem without disturbing the established lattice arrangement, a group of second core elements 38 are provided which in the embodiment of FIGURE 2 are positioned in the tricusps defined by the first core elements 36. The second core elements facilitate the overall adjustment of the volume of the coolant passages 39 and also make it possible to selectively adjust the volume of coolant passages in various regions of the core. These second core elements 38 are also circular cylinders arranged with their axes parallel to the axes of the first core elements 36. The second core elements generally have radii smaller than the radii of the first core elements and geometrical considerations show that the maximum radius of a second core element in the embodiment shown in FIGURE 2 utilizing the tricusp pattern is $$\left(\frac{2}{\sqrt{3}} - 1\right)r$$

where $r$ is the radius of any of the first core elements. For convenience, this dimension will be referred to hereinafter by its approximation in decimal form, i.e. $0.1547r$. When the radii of the second core elements have this dimension, each of the second core elements 38 will be tangent to all three of the adjacent first core elements 36, thus defining three distinct smaller longitudinal channels 40 for coolant flow. On the other hand, the radii of the second core elements 38 may be made smaller than $0.1547r$ and one or even more second core elements may be positioned in each tricusp. Such a relationship is shown in the core region designated by the numeral 42.

It may be seen that the total volume of coolant passages in relation to the volume of the core, and hence the amount of heat removed, is affected by the number and size of second core elements positioned in the tricusps. Furthermore, the placement of the second core elements in various regions of the core will affect the volume of coolant passages within the various regions. Selective placement of the second core elements in various regions of the core thus greatly facilitates control of core temperature distribution and heat removal. For example, if more heat is generated in the axial region of the core than in the peripheral regions, more second core elements may be placed in the peripheral regions than in the axial region and, as a result, more heat will be removed from the axial region than from the peripheral regions.

In certain regions of the core, it may be desirable to entirely omit the second core elements, as is shown in the central region of the core illustrated in FIGURE 2. The reason for such an arrangement is the ordinary distribution of heat flux in a reactor core previously mentioned, i.e., a radial decrease in heat flux from a maximum at or near the center of the core. The composition of the fuel elements, their placement and other parameters of the reactor core may be such that it is desirable or necessary to utilize the entire volume of coolant passages provided by the tricusps in the central region of the core for coolant flow. Since heat flux is less in the regions near the periphery of the core, such a volume of coolant passages may be excessive in the peripheral regions. Hence, it may be desired to utilize the arrangement illustrated in FIGURE 2 having several tricusps in the central region which contain no second core elements.

Turning now to the alternate embodiment illustrated in FIGURE 3, first core elements 136 containing nuclear fuel are provided in the form of circular cylinders mounted with their axes parallel to one another in an equilateral triangular array as in the embodiment shown in FIGURE 2. In the embodiment shown in FIGURE 3, however, the centers of the first core elements are positioned on the corners of equilateral triangles having sides which are slightly larger than the diameters of the first core elements which elements, therefore, are spaced from each other. The central areas of the above mentioned equilateral triangles are occupied by the second core elements 138, which as in the embodiment of FIGURE 2 may contain fuel, neutron moderating material, neutron power material, or fertile material. The second core elements 138 in the embodiment of FIGURE 3 have radii slightly larger than $0.1547r$ which radii are coordinated with the size and spacing of the first core elements so that each one functions as a spacer separating the three adjacent fuel elements 136 from one another. As a result, coolant passages 139 having thin cross sections are formed which cross sections are bounded on their two smaller ends by the sides of the second core elements 138 and on each side by the sides of the first core elements 136 which include fuel. The effect of this configuration on heat removal, as compared with the embodiment of FIGURE 2, is to cause more coolant to come in thermal contact with the first core elements 136 containing fuel and thereby facilitate transfer of heat from such elements. As in the embodiment of FIGURE 2, the second core elements 138 are omitted from the central or axial region of the core.

In both the illustrated embodiments of the invention the second core elements 38 or 138 may also be utilized to regulate neutron flux in various regions of the core. Such regulation of neutron flux will indirectly affect heat flux in the same regions. More specifically, where fuel or moderator materials are employed in the second core elements, neutron flux, and heat flux will be increased. Where neutron poison materials are employed, neutron flux and heat flux will be decreased. The effect of fertile materials will depend upon the particular material utilized and other parameters of the reactor and may be to either increase or decrease neutron and heat flux.

A particularly useful embodiment of the invention in which the effect on heat flux of the choice of material for the second core elements 38 or 138 and the effect on heat flux of the placement of the second core elements always complement each other results when fuel material or moderating material are included in the second core elements. The nuclear properties of such materials increase neutron flux in the regions where they are placed and thereby increase heat flux in such regions. Concomitantly, the volume of the second core elements reduces the volume of coolant passages and increases the temperature in such regions. Conversely, if second core elements containing fuel or moderator are omitted from certain regions, the neutron flux, and therefore, the heat flux are decreased while the temperature is lowered by the increased volume of coolant passages through such regions.

On the other hand, in some applications, it may be desirable to decrease neutron flux in certain regions while decreasing coolant passage volume, or conversely, to increase neutron flux in certain regions while increasing the volume of coolant passages. In such applications, second core elements 38 or 138 containing neutron poisons may be utilized. The presence of such elements in selected regions of the core decreases neutron flux and coolant passage volume and the omission of such elements from other regions increases neutron flux and coolant passage volume.

A specific embodiment of an improved reactor core in accordance with the present invention is set forth in the following example. It should be considered that this data is merely illustrative of certain of the features of the invention and should not be construed as limiting the invention to specific structural materials or operating conditions.

*Example*

Core geometry:
- Shape _____ Right circular cylinder.
- Height _____ 4.5 feet.
- Diameter _____ 4.5 feet.
- Volume _____ 71.5 cubic feet.

First core elements:
- Materials _____ Plutonium dioxide (fuel) and beryllium oxide (moderator) as a sintered composite.
- Cladding _____ Type .316 stainless steel, 0.020 in. thick.
- Length _____ 4.5 feet.
- Diameter _____ 2.0 in.
- Number _____ 565
- Total BeO _____ 3850 kg.
- Total PuO$_2$ ____ 71 kg.

Second core elements:
- Material ------- Zirconium hydride (moderator) as a composition ($ZrH_{1.4}$).
- Cladding ------- Type .316 stainless steel, 0.020 in. thick.
- Length -------- 4.5 feet.
- Diameter ------ 0.5 in.
- Number ------- 848.
- Location ------ Outer 75% of core.
- Total $ZrH_{1.4}$ ---- 805 kg.

Volume composition of core: Percent
- $PuO_2$, BeO and Cladding -------------------- 80
- $ZrH_{1.4}$ -------------------------------------- 8
- Void -------------------------------------- 12

Coolant:
- Material --------------------------- helium
- Flow rate, lb./sec. --------------------- 63.6
- Pressure, p.s.i.a ---------------------- 1000
- Inlet temperature, °F. -------------------- 600
- Outlet temperature, °F. ---------------- 1200

Reflector:
- Material ------------------------- Graphite.
- Thickness, in. -------------------------- 12
- Total core loading, kg., $Pu_{239}$ -------------- 47
- Core power rating, megawatts (thermal) ---- 50
- Peak fuel element surface temperature, °F. -- 1330
- Average heat flux, B.t.u/ft.$^2$/sec. ---------- 37.5

The dimensions of the first and second core elements in this example are such as to provide coolant passages having thin cross sections as illustrated in FIGURE 3. The distribution of temperature along the core length for various paths of equal heat flux which correspond generally to various distances from the axis of the core is shown in solid lines in FIGURE 4. More particularly, the upper middle, lower solid line curves show the temperature distribution along the paths of high, mean and low heat flux respectively.

The dashed line in FIGURE 4 shows the calculated temperature distribution along the center of the core if the second core elements were positioned throughout the core instead of only in the outer three-fourths of the core as is true of the core of the example. Thus it can be seen that selective distribution of the second core elements which contain moderating material permits the mean temperature and high temperature of the core to be adjusted with respect to each other. In the core of the example the mean and high temperatures were caused to be closer to each other so as to maximize the efficiency of heat removal by the coolant.

It would, of course, be possible to change the relative dimensions of the first and second core elements so that the coolant passages would have cross sections in the form of tricusps as shown in FIGURE 2. If the first core elements were fabricated with 2 inch diameters or 1 inch radii as in the above example, the maximum radii of the second core elements in such a case would be .1547 x 1 inch or .1547 in.

Various changes and modifications may be made in the above described reactor core without departing from the invention. For example, the fuel, moderator and coolant could be of a variety of materials and fertile materials could be utilized in some core elements to breed nuclear fuel all of which variations would fall within the spirit and scope of the present invention, various features of which are set forth in the accompanying claims.

I claim:

1. A core assembly for a nuclear reactor, comprising a plurality of core elements in the form of circular cylinders mounted with their axes parallel to one another to provide longitudinally extending passages therebetween for a fluid coolant, said plurality of core elements including first core elements of equal radii containing nuclear fuel material and positioned in an equilateral triangular array, said plurality of core elements further including second core elements having radii smaller than the radii of said first core elements so that the volume of the coolant passages in the core is regulated whereby temperature distribution in the core and heat removal therefrom are optimized.

2. A core assembly for a nuclear reactor, comprising a plurality of core elements in the form of circular cylinders mounted with their axes parallel to one another to provide longitudinally extending passages therebetween for a fluid coolant, said plurality of core elements including first core elements of equal radii containing nuclear material and positioned in an equilateral triangular array, said plurality of core elements further including second core elements having radii smaller than the radii of said first core elements so that the volume of the coolant passages in the core is regulated, said second core elements being positioned in selected regions of the core so that the volume of coolant passages in various regions of the core is regulated, whereby temperature distribution in the core and heat removal therefrom are optimized.

3. A core assembly for a nuclear reactor, comprising a plurality of core elements in the form of circular cylinders mounted with their axes parallel to one another to provide longitudinally extending passages therebetween for a fluid coolant, said plurality of core elements including first core elements of equal radii containing nuclear fuel material and positioned in a triangular array with their axes on the corners of equilateral triangles having sides equal to the diameters of said first core elements, said plurality of core elements further including second core elements having maximum radii of 0.1547 times the radii of said first core elements so that the volume of the coolant passages in the core is regulated whereby temperature distribution in the core and heat removal therefrom are optimized.

4. A core assembly for a nuclear reactor, comprising a plurality of core elements in the form of circular cylinders mounted with their axes parallel to one another to provide longitudinally extending passages therebetween for a fluid coolant, said plurality of core elements including first core elements of equal radii containing nuclear fuel material and positioned in a triangular array with their axes on the corners of equilateral triangles having sides slightly larger than the diameters of said first core elements, said plurality of core elements further including second core elements having radii slightly larger than 0.1547 times the radii of said first core elements so that the volume of the coolant passages in the core is regulated and the coolant passages have thin cross-sections so as to facilitate heat flow to the coolant, whereby temperature distribution in the core and heat removal therefrom are optimized.

5. A core assembly for a nuclear reactor, comprising a plurality of core elements in the form of circular cylinders mounted with their axes parallel to one another to provide longitudinally extending passages therebetween for a fluid coolant, said plurality of core elements including first core elements of equal radii containing nuclear fuel material and positioned in a equilateral triangular array, said plurality of core elements further including second core elements having radii smaller than the radii of said first core elements so as to regulate the volume of the coolant passages in the core, said second core elements including nuclear fuel material so as to regulate neutron flux in the core whereby neutron flux and temperature distribution in the core and heat removal therefrom are optimized.

6. A core assembly for a nuclear reactor, comprising a plurality of core elements in the form of circular cylinders mounted with their axes parallel to one another to provide longitudinally extending passages therebetween for a fluid coolant, said plurality of core elements includnig first core elements of equal radii containing nuclear fuel material and positioned in an equilateral triangular array, said plurality of core elements further including second core elements having radii smaller than the radii of said first core elements so as to regulate the volume of the coolant passages in the core, said second core elements including neutron moderating material so as to regulate neutron flux in the core whereby neutron flux and temperature distribution in the core and heat removal therefrom are optimized.

7. A core assembly for a nuclear reactor, comprising a plurality of core elements in the form of circular cylinders mounted with their axes parallel to one another to provide longitudinally extending passages therebetween for a fluid coolant, said plurality of core elements including first core elements of equal radii containing nuclear fuel material and positioned in an equilateral triangular array, said plurality of core elements further including second core elements having radii smaller than the radii of said first core elements so as to regulate the volume of the coolant passages in the core, said second core elements including neutron poison material so as to regulate neutron flux in the core whereby neutron flux and temperature distribution in the core and heat removal therefrom are optimized.

8. A core assembly for a nuclear reactor, comprising a plurality of core elements in the form of right circular cylinders mounted with their axes parallel to one another to provide longitudinally extending passages therebetween for a fluid coolant, said plurality of core elements including a plurality of first core elements having equal radii and containing nuclear fuel material and positioned in a triangular array with their axes positioned on the corners of a plurality of interconnected equilateral triangles having sides equal to the diameters of said first core elements so that the first core elements are tangent to one another along longitudinal lines and the longitudinal passages for coolant flow have the cross sectional shape of tricusps, said plurality of core elements further including second core elements having maximum radii of 0.1547 times the radii of said first core elements and being positioned in selected coolant passages so that the total volume of coolant passages in the core and the volume of coolant passages in selected regions of the core are regulated, whereby temperature distribution in the core and heat removal therefrom are optimized.

9. A core assembly for a nuclear reactor, comprising a plurality of core elements in the form of right circular cylinders mounted with their axes parallel to one another to provide longitudinally extending passages therebetween for a fluid coolant, said plurality of core elements including a plurality of first core elements having equal radii and containing nuclear fuel material and positioned in a triangular array with their axes positioned on the corners of a plurality of interconnected equilateral triangles having sides slightly greater than the diameters of said first core elements so that said first core elements are spaced from one another and the longitudinal passages for coolant flow have generally thin cross sectional shapes so as to facilitate heat flow to the coolant, said plurality of core elements further including second core elements having radii slightly larger than 0.1547 times the radii of said first core elements and being positioned in the centers of selected ones of said equilateral triangles so that the total volume of coolant passages in the core and the volume of coolant passages in selected regions of the core are regulated, whereby temperature distribution in the core and heat removal therefrom are optimized.

References Cited by the Examiner

UNITED STATES PATENTS

| 3,049,487 | 8/1962 | Harrer et al. | 176—42 |
| 3,104,219 | 9/1963 | Sulzer | 176—78 |
| 3,179,571 | 4/1965 | Schabert et al. | 176—83 |
| 3,180,801 | 4/1965 | Rickert et al. | 176—61 |
| 3,186,913 | 6/1965 | Weisner et al. | 176—94 |
| 3,215,606 | 11/1965 | Silvester | 176—61 |
| 3,253,997 | 5/1966 | Abbott | 176—42 |

FOREIGN PATENTS 1,252,674   12/1960   France.

CARL D. QUARFORTH, *Primary Examiner.*
L. DEWAYNE RUTLEDGE, *Examiner.*